Patented July 21, 1931

1,815,876

UNITED STATES PATENT OFFICE

MICHAEL MÜLLER, OF BERLIN-CHARLOTTENBURG, GERMANY, ASSIGNOR TO SIEMENS BAUUNION G. M. B. H., KOMMANDITGESELLSCHAFT, OF SIEMENSSTADT, NEAR BERLIN, GERMANY, A CORPORATION OF GERMANY

PROCESS OF CHEMICALLY SOLIDIFYING EARTH

No Drawing. Application filed December 2, 1929, Serial No. 411,199, and in Germany January 25, 1929.

My invention relates to processes of chemically solidifying earth, and more particularly to such processes in which silicic acid containing substances are employed.

For the purpose of separating free silicic acid in the known processes of solidification or consolidation aqueous solutions of salts or acids are usually employed. These processes have the drawback that the chemicals do not penetrate the earth to the extent desired and furthermore do not become fully operative.

According to my invention these drawbacks are eliminated by applying gaseous substances, more particularly highly reactive gases, to the silicic acid containing subtances in the earth instead of salts or acids. The gases, particularly highly reactive gases, are preferably applied to the earth or stony matter from the outside, for instance from the top of the earth, and cause the formation of silicic acid which combines with the quartz-containing constituents of the earth.

According to my invention chlorine is used as the gaseous substance.

In comparison with the known processes the application of chlorine presents the advantage that the chlorine penetrates much more easily into the pores, interstices or fissures of the earth than a liquid. Due to the solubility of the chlorine in water its action in humid earth is still further increased in so far as the ground water absorbs a part of the introduced chlorine. The chlorine containing water also participates in the precipitation of the chlorides, for instance in the precipitation of NaCl if the earth has been saturated with $Na_2SiO_3$.

A special advantage of my improved process is that the chlorine may be directly drawn from a steel bottle whereby the tedious screwing on and off of supply pipes, the dissolving of the otherwise employed chamicals as well as the pump for forcing the solutions into the earth are unnecessary.

I claim as my invention:

The process of chemically solidifying earth, which consists in saturating the earth with silicic acid containing substances and then applying chlorine to it.

In testimony whereof I affix my signature.

MICHAEL MÜLLER.